United States Patent
Seki et al.

(10) Patent No.: US 8,107,900 B2
(45) Date of Patent: Jan. 31, 2012

(54) MULTI-CARRIER TRANSMISSION DEVICE

(75) Inventors: Yuta Seki, Kanagawa (JP); Yasuhiro Hasegawa, Miyagi (JP); Shinji Ueda, Kanagawa (JP)

(73) Assignee: Panasonic Corporation, Osaka (JP)

( * ) Notice: Subject to any disclaimer, the term of this patent is extended or adjusted under 35 U.S.C. 154(b) by 856 days.

(21) Appl. No.: 12/089,200

(22) PCT Filed: Oct. 6, 2005

(86) PCT No.: PCT/JP2005/018538
§ 371 (c)(1),
(2), (4) Date: Apr. 3, 2008

(87) PCT Pub. No.: WO2007/043151
PCT Pub. Date: Apr. 19, 2007

(65) Prior Publication Data
US 2010/0151803 A1    Jun. 17, 2010

(51) Int. Cl.
*H04B 1/04* (2006.01)
(52) U.S. Cl. ............... 455/114.2; 455/114.1; 455/114.3; 455/522; 455/91; 375/260; 375/295; 375/296; 375/297; 330/149; 370/210
(58) Field of Classification Search ............... 455/115.1, 455/117, 126, 127.1, 114.7, 114.1, 114.2, 455/114.3, 522, 91; 375/259, 260, 286, 295, 375/296, 146, 275, 297; 370/210; 330/149
See application file for complete search history.

(56) References Cited

U.S. PATENT DOCUMENTS

| | | | |
|---|---|---|---|
| 6,304,140 B1 * | 10/2001 | Thron et al. | 330/149 |
| 6,504,862 B1 * | 1/2003 | Yang | 375/146 |
| 6,885,850 B2 * | 4/2005 | Kobayashi et al. | 455/115.1 |
| 6,931,079 B1 * | 8/2005 | Peeters | 375/296 |
| 7,061,991 B2 * | 6/2006 | Wright et al. | 375/296 |
| 7,376,201 B2 * | 5/2008 | Kim | 375/296 |
| 7,409,009 B2 * | 8/2008 | Akhtman | 375/296 |

(Continued)

FOREIGN PATENT DOCUMENTS

JP     2002-185432    6/2002

(Continued)

OTHER PUBLICATIONS

International Search Report dated Jan. 10, 2006.

*Primary Examiner* — Junpeng Chen
(74) *Attorney, Agent, or Firm* — Dickinson Wright PLLC (57) ABSTRACT

A multi-carrier transmission device improves peak suppression efficiency in a multi-carrier signal. The multi-carrier transmission device (100) has a peak suppression unit (140) for dividing a multi-carrier signal into two parts: a first multi-carrier signal and a second multi-carrier signal. A peak signal detection unit (142) detects a power value at a predetermined interval concerning the first multi-carrier signal. When the detected power value is equal to or above a predetermined level, a peak extraction unit (144) extracts a signal component equal to or above the predetermined level from the first multi-carrier signal. A band limit filter unit (146) passes only a predetermined band from the extracted signal component. An adder (154) subtracts the signal component after the band limit from the second multi-carrier signal. A multiplier (150) is arranged at a latter stage of the band limit filter unit (146) and multiplies a weight for compensating the power loss in the band limit filter unit (146) and the first multi-carrier signal.

5 Claims, 6 Drawing Sheets

U.S. PATENT DOCUMENTS

| | | | |
|---|---|---|---|
| 7,532,678 B2 * | 5/2009 | Henkel et al. | 375/275 |
| 7,539,464 B2 * | 5/2009 | Suzuki et al. | 455/114.3 |
| 7,830,783 B2 * | 11/2010 | Clausen et al. | 370/210 |
| 2002/0042253 A1 | 4/2002 | Dartois | |
| 2004/0090283 A1 | 5/2004 | Naito | |
| 2006/0133524 A1 * | 6/2006 | Hamada et al. | 375/260 |
| 2007/0188218 A1 | 8/2007 | Ueda | |

FOREIGN PATENT DOCUMENTS

| | | |
|---|---|---|
| JP | 2003-298549 | 10/2003 |
| JP | 2004-104162 | 4/2004 |
| JP | 2004-320432 | 11/2004 |
| JP | 2005-269550 | 9/2005 |

* cited by examiner

MULTI-CARRIER TRANSMISSION DEVICE

TECHNICAL FIELD

The present invention relates to a multicarrier transmitting apparatus. More particularly, the present invention relates to a multicarrier transmitting apparatus that reduces peaks appearing in multicarrier signals.

BACKGROUND ART

Multicarrier transmission is becoming a focus of attention as a high-speed transmission technique that reduces the influence of frequency selective fading caused by multipath channels. In this multicarrier transmission, sharp power peaks are produced in a generated multicarrier signal. When these signals having great peaks are inputted to a nonlinear amplifier, these signals are amplified in a nonlinear amplifier with nonlinear distortion, and so, these are causes of deterioration of transmission characteristics and out-of-band radiation in multicarrier transmission. To prevent this, it is conceivable that back-off may be provided with a nonlinear amplifier, but, efficiency of an amplifier deteriorates.

Then, various techniques (e.g. Patent documents 1 and 2) to reduce peaks in multicarrier signals, are proposed.

For example, in Patent Document 2, peak reduction is attempted as the following steps. That is, first, peaks for transmission data are detected using a threshold, and differential data between the peaks and the threshold, that is, peak components that are beyond a threshold in a signal, are generated. Second, the generated peak components are band-limited by filter processing. Third, peak components after band-limiting are subtracted from the original transmission data. As such, transmission data where peaks are decreased is formed.

Patent Document 1: Japanese Patent Application Laid-Open No. 2002-185432
Patent Document 2: Japanese Patent Application Laid-Open No. 2004-104162

DISCLOSURE OF INVENTION

Problems to be Solved by The Invention

However, with conventional multicarrier transmitting apparatuses, no consideration is given to power loss in band-limiting in the second step above. That is, the peak components generated in the first step have a wide bandwidth, and so power loss occurs when band-limiting is carried out in the second step, and consequently, peak components still remain even when the peak components after band-limiting are subtracted from the original transmission data. Although by repeating this processing, removing peak components is possible, is involved a problem that the number of times processing is repeated is many, that is, peak reduction efficiency is bad. Increasing the number of times processing is repeated leads to circuit scale increase, so that, there is a problem that a multicarrier transmitting apparatus itself becomes larger.

The present invention is made in view of the above-described problems, and it is therefore an object of the present invention to provide a multicarrier transmitting apparatus that makes it possible to improve peak reduction efficiency in multicarrier signals.

Means for Solving The Problem

The multicarrier transmitting apparatus of the present invention provides a peak reduction section that reduces peak power appearing in a multicarrier signal and the peak reduction section adopts a configuration including: a power detection section that divides the multicarrier signal into two multicarrier signals and detects power values at regular intervals with respect to one multicarrier signal; a signal component extraction section that, when a detected power value is equal to or greater than a predetermined level, extracts a signal component equal to or greater than the predetermined level from the one multicarrier signal; a band-limiting filter that only allows to pass a predetermined band in the extracted signal component; an adder that subtracts the signal component after the band-limiting from the other multicarrier signal; and a multiplier that is arranged subsequent to the band-limiting filter and that multiplies the other multicarrier signal and a weight for compensation for power loss in the band-limiting filter.

Advantageous Effect of the Invention

According to the present invention, it is possible to provide a multicarrier transmitting apparatus that improves peak reduction efficiency in multicarrier signals.

BEST MODE FOR CARRYING OUT THE INVENTION

Embodiments of the present invention will be described below in detail with reference to the accompanying drawings. Further, in embodiments, the same components are assigned the same reference numerals and overlapping descriptions are omitted.

Embodiment 1

Figure 1:
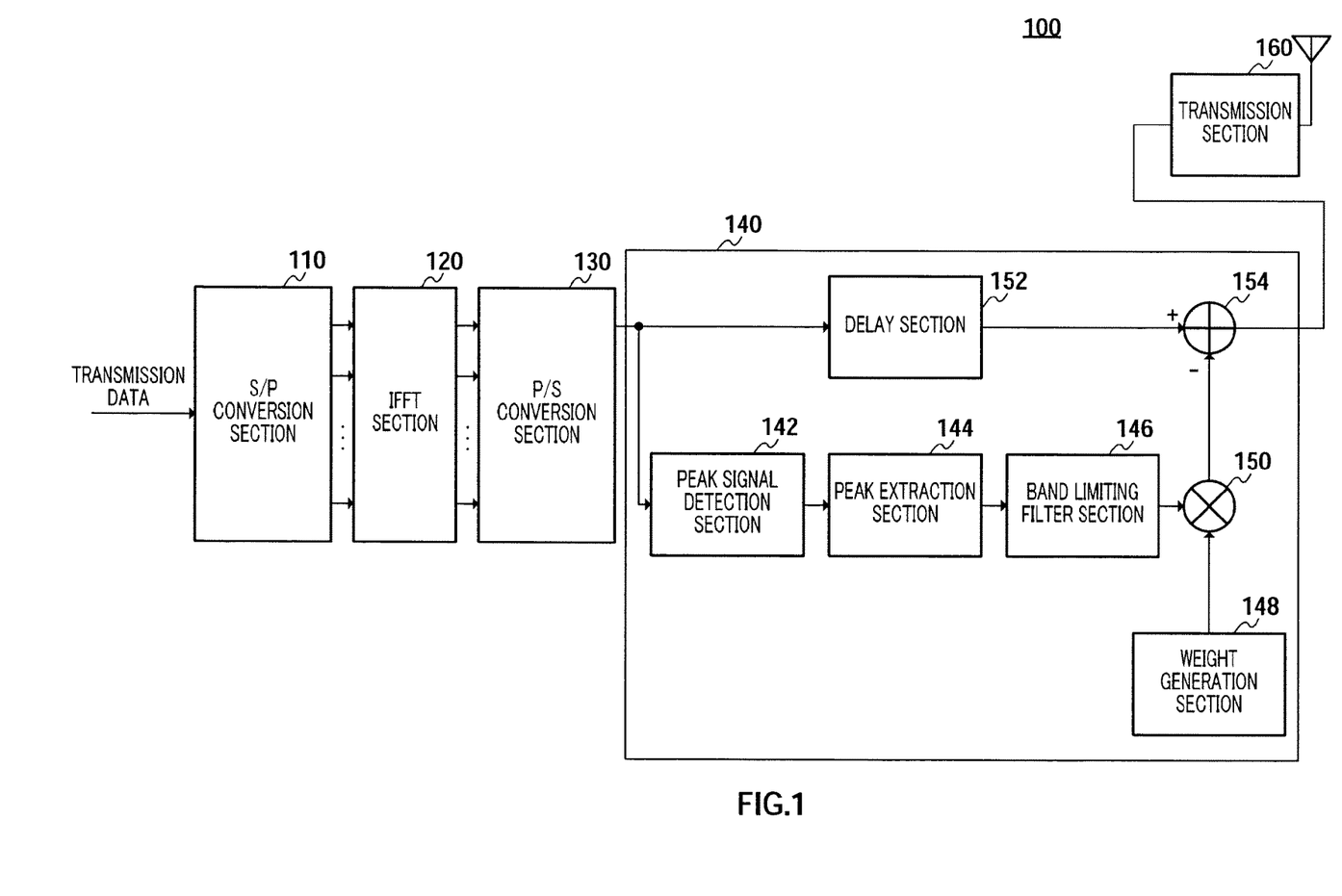
FIG. 1 is a block diagram showing a configuration of the multicarrier transmitting apparatus according to Embodiment 1 of the present invention.

As shown in FIG. 1, multicarrier transmitting apparatus 100 in Embodiment 1 has S/P conversion section 110, IFFT section 120, P/S conversion section 130, peak reduction section 140 and transmission section 160. Then, peak reduction section 140 has peak signal detection section 142, peak extraction section 144, band limiting filter section 146, weight generation section 148, multiplier 150, delay section 152 and adder 154.

S/P conversion section 110 receives modulated and encoded transmission data as input. This S/P conversion section 110 serial-to-parallel-converts the inputted signal, and outputs the signal to IFFT section 120.

IFFT section 120 performs an inverse fast Fourier transform on the inputted signal after serial-to-parallel conversion and outputs the inputted signal after inverse fast Fourier transform to P/S conversion section 130.

P/S conversion section 130 parallel-to-serial-converts the inputted signal after the inverse fast Fourier transform and acquires a multicarrier signal. This multicarrier signal is outputted to delay section 152 and peak signal detection section 142.

Peak signal detection section 142 detects the instantaneous power of the inputted signal at predetermined timing intervals (i.e. sample timings) and outputs the detected power value at each timing and the multicarrier signal at each timing to peak extraction section 144.

Peak extraction section 144 compares the inputted detected power values with the preset threshold value, and, when a detected power value are smaller than the threshold value, peak extraction section 144 outputs a zero to band limiting filter section 146. Moreover, when a detected power value is equal to or greater than the threshold value, peak extraction section 144 outputs the signal as the peak signal component where the power related to the threshold is subtracted from the timing of the multicarrier signal to band limiting filter section 146.

Band limiting filter section 146 limits the band of the inputted signal and outputs the peak signal component subjected to band-limiting to multiplier 150.

Weight generation section 148 outputs the weight for compensation for power loss of the peak signal component resulting from band-limiting in band limiting filter section 146, to multiplier 150. Here, the present embodiment uses the weight with a fixed value set in advance.

Multiplier 150 multiplies the peak signal component subjected to band-limiting from band limiting filter section 146 and the weight from weight generation section 148 and outputs the operation result to adder 154.

The output signal outputted from P/S conversion section 130 is divided into two routes and delay section 152 gives the multicarrier signal a delay so as to synchronize the time when one multicarrier signal is inputted to adder 154 through peak signal detection section 142, peak extraction section 144, band limiting filter section 146 and multiplier 150, and the time when the other multicarrier signal is inputted to adder 154 through delay section 152. That is, the multicarrier signal and the peak signal component are synchronized. Then, the delayed multicarrier signal is inputted to adder 154.

By subtracting the peak signal components weighted processing from the multicarrier signal inputted through delay section 152, adder 154 reduces peaks of the multicarrier signal. The multicarrier signal after this peak reduction is applied predetermined processing such as D/A conversion, frequency conversion and power control and transmitted via an antenna.

In this way, according to Embodiment 1, multicarrier transmitting apparatus 100 provides peak reduction section 140, and this peak reduction section 140 has: peak signal detection section 142 that divides a multicarrier signal into two and detects power values at regular intervals in one multicarrier signal; peak extraction section 144 that, when a detected power value is equal to or greater than a predetermined level, extracts signal component which is equal to or greater than the predetermined level, from one multicarrier signal; band limiting filter section 146 that allows to pass only predetermined band in the extracted signal component; adder 154 that subtracts the signal component after band-limiting from the other multicarrier signal; and multiplier 150, which is arranged subsequent to band limiting filter section 146, that multiplies the other multicarrier signal and the weight for compensation for power loss in band limiting filter section 146.

By this means, it is possible to subtract (peak) signal components where power loss resulting from band-limiting is compensated for, from the original multicarrier signal, so that, speed for removing (peak) signal components becomes faster than in conventional cases. As a result, the number of times subtraction of (peak) signal component is repeated decreases, thereby improving peak reduction efficiency. Furthermore, the number of times subtraction of (peak) signal component is repeated decreases, thereby minimizing the circuit scale and realizing miniaturization and weight reduction of the multicarrier transmitting apparatus.

Embodiment 2

Figure 2:
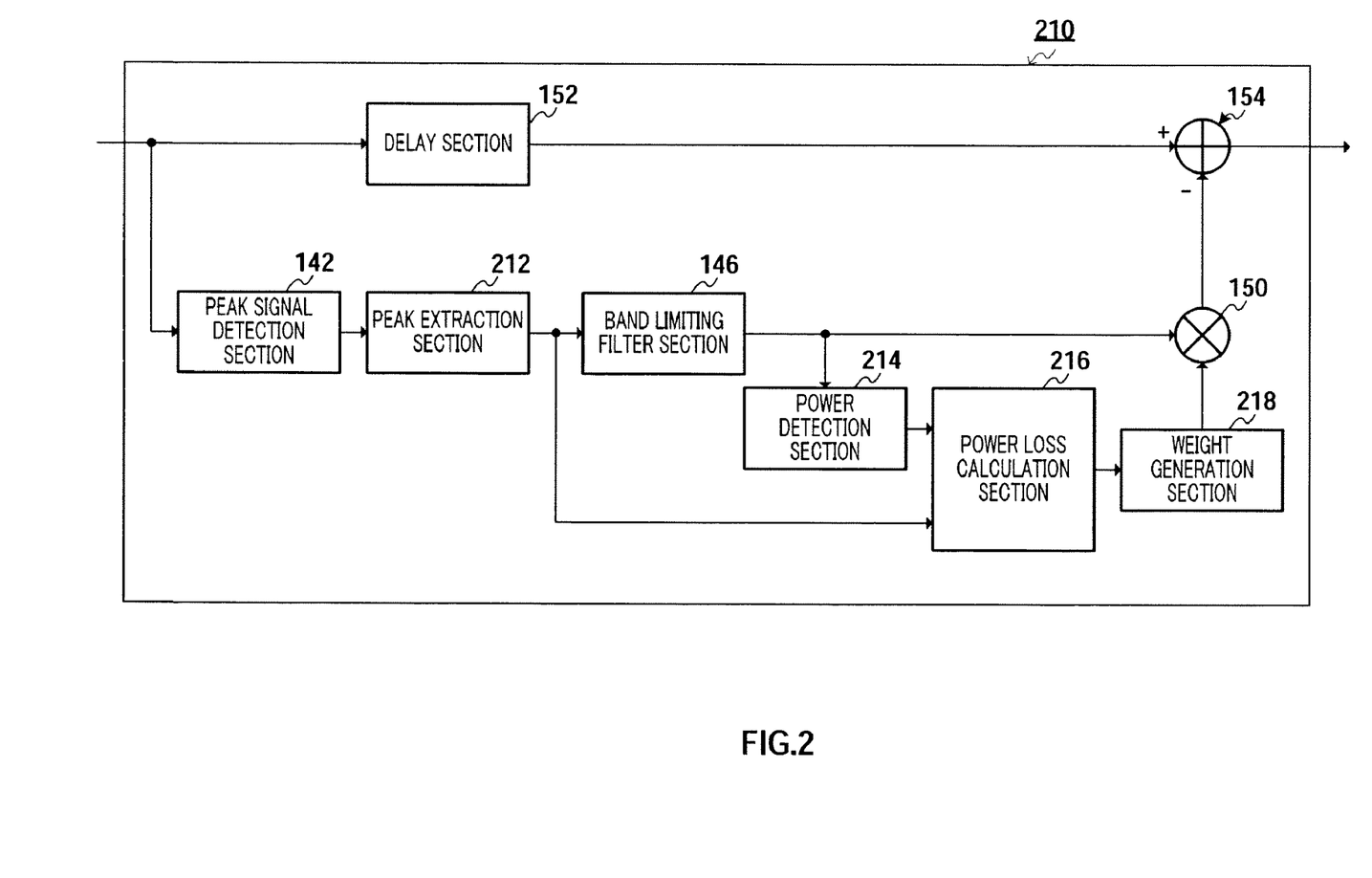
FIG. 2 is a block diagram showing a configuration of the peak reduction section of the multicarrier transmitting apparatus according to Embodiment 2 of the present invention.

As shown in FIG. 2, the multicarrier transmitting apparatus of Embodiment 2 has peak reduction section 210, and peak reduction section 210 has peak extraction section 212, power detection section 214, power loss calculation section 216 and weight generation section 218.

Peak extraction section 212 compares inputted detected power values with the preset threshold value, and, when a detected power value is smaller than the threshold value, peak extraction section 212 outputs a zero to band limiting filter section 146 and the detected power value to power loss calculation section 216. Moreover, when the detected power value is equal to or greater than a threshold value, peak extraction section 212 outputs the detected power value to power loss calculation section 216 and outputs the signal as the peak signal component where the power related to the threshold is subtracted from the timing of the multicarrier signal, to band limiting filter section 146.

Power detection section 214 detects the power value of the peak signal component after band-limiting, which is the output from band limiting filter section 146, and outputs the detected power value to power loss calculation section 216.

Power loss calculation section 216 receives the power value from peak extraction section 212, that is, the power value which is detected at predetermined timing (i.e. sample timing) in peak signal detection section 142 and which is equal to or greater than the preset threshold, and receives a power value with the same timing from power detection section 214. Then, using the inputted detected power values, power loss calculation section 216 calculates the integral of the difference between the detected power value of the peak signal component to be inputted to the band-limiting filter and the detected power value of the peak signal component over a predetermined period (e.g. 1 OFDM symbol), that is, calculates the power loss over the predetermined period in band limiting filter section 146. This value of power loss (power loss value) is outputted to weight generation section 218.

Based on the inputted power loss value, weight generation section 218 calculates a weight for compensation for power loss of the peak signal component resulting from band-limiting in band limiting filter section 146 and outputs the calculated weight to multiplier 150. That is, the weight calculated in weight generation section 218 is updated on a per above predetermined period basis (i.e. 1 OFDM symbol).

In this way, according to Embodiment 2, multicarrier transmitting apparatus provides peak reduction section 210, and this peak reduction section 210 has: peak signal detection section 142 that divides a multicarrier signal into two and detects power values at regular intervals in one multicarrier signal; peak extraction section 212 that, when a detected power value is equal to or greater than a predetermined level, extracts signal component which is equal to or greater than the predetermined level, from one multicarrier signal; band limiting filter section 146 that allows to pass only predetermined band in the extracted signal component; adder 154 that subtracts the signal component after band-limiting from the other multicarrier signal; and multiplier 150, which is arranged subsequent to band limiting filter section 146, that multiplies the other multicarrier signal and the weight for compensation for power loss in band limiting filter section 146. Additionally, the multicarrier transmitting apparatus provides weight generation section 218 that forms a weight in accordance with the difference between the power value of the signal component before band-limiting and the power value of the signal component after band-limiting in band limiting filter section 146.

By this means, it is possible to subtract (peak) signal components compensated for by weights formed based on power loss derived from power values before and after band-limiting, from the original multicarrier signal, so that, speed of removing (peak) signal components becomes still faster than in Embodiment 1. As a result, the number of times subtraction of (peak) signal component is repeated decreases, thereby improving peak reduction efficiency. Furthermore, the number of times subtraction of (peak) signal component is repeated decreases, thereby minimizing the circuit scale and realizing miniaturization and weight reduction of the multicarrier transmitting apparatus.

Embodiment 3

Figure 3:
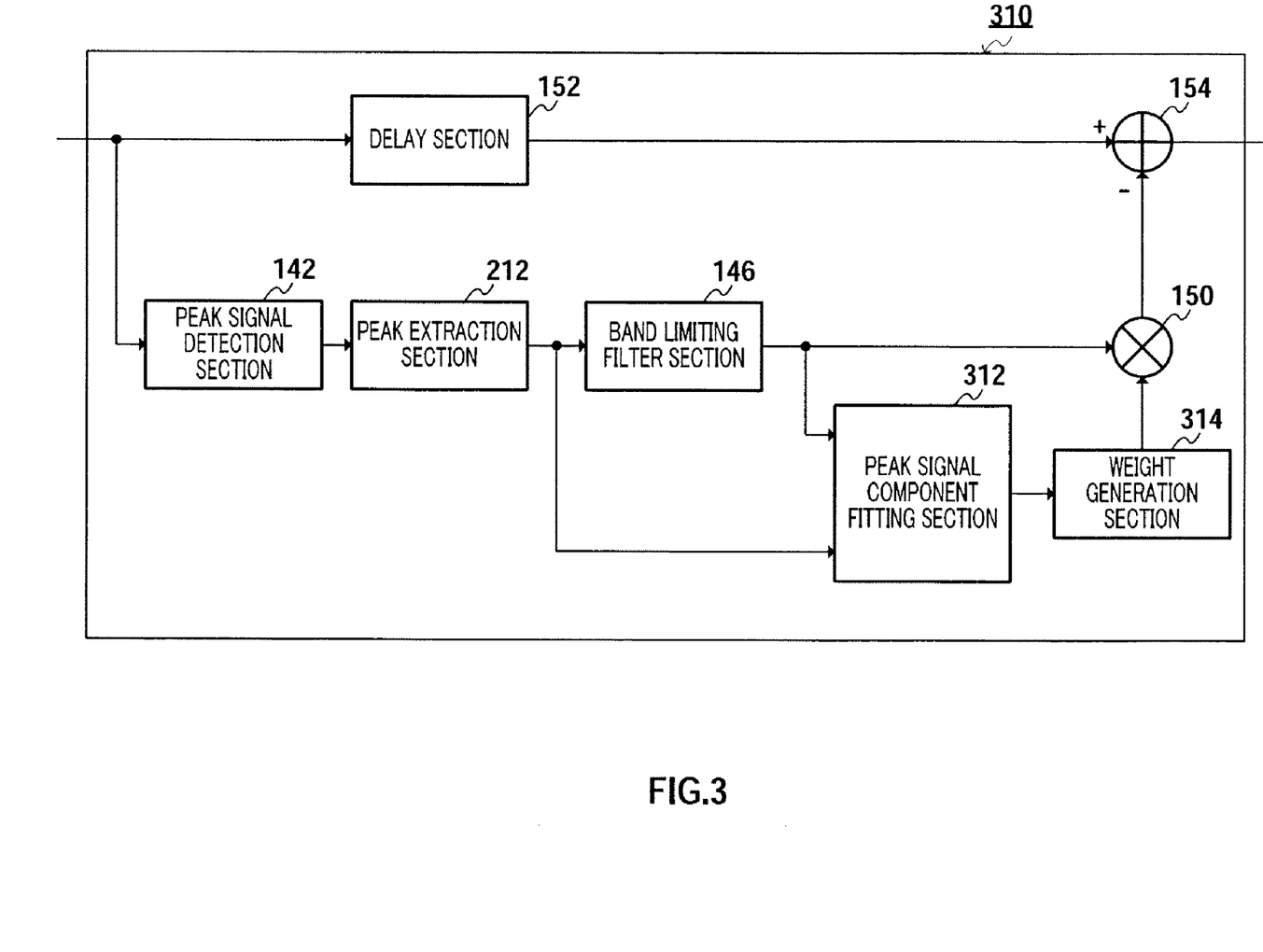
FIG. 3 is a block diagram showing a configuration of the peak reduction section of the multicarrier transmitting apparatus according to Embodiment 3 of the present invention.

As shown in FIG. 3, the multicarrier transmitting apparatus of Embodiment 3 has peak reduction section 310, and peak reduction section 310 has peak signal component fitting section 312 and weight generation section 314.

Peak signal component fitting section 312 changes a weight candidate sequentially and determines the weight candidate so as to minimize a difference between a peak signal component from peak extraction section 212 and result of multiplying the weight candidate and a peak signal component after band-limiting. That is, peak signal component fitting section 312 changes the weight candidate sequentially, fits the result of multiplying the weight candidate and the peak signal component after band-limiting, with the peak signal component from peak extraction section 212 and determines the optimal weight. To be more specific, peak signal fitting component section 312 determines the weight such that, the difference between the waveform of the peak signal component from peak extraction section 212 (i.e. waveform of amplitude value in the time domain) and the waveform of the result of multiplying the weight candidate and the peak signal component after band-limiting is minimum over a predetermined period (e.g. 1 OFDM symbol). Incidentally, here, the weight candidate which the difference is minimum using the least square method is determined as optimal weight.

Weight generation section 314 forms the weight in accordance with the weight determined in peak signal component fitting section 312 and outputs the formed weight to multiplier 150.

Incidentally, although a case has been explained with the above explanation where peak signal component fitting section 312 fits all sample points in peak signal components, that is, all sampling timings over a predetermined period (e.g. 1 OFDM symbol), the present embodiment is not limited to this, and an optimal weight may be determined so as to match a peak signal component before band-limiting and a peak signal component after band-limiting in a sample point, for example, the sample point where the detected power value in the peak signal component before band-limiting is maximum.

In this way, according to Embodiment 3, multicarrier transmitting apparatus provides peak reduction section 310, and this peak reduction section 310 has: peak signal detection section 142 that divides a multicarrier signal into two and detects power values at regular intervals in one multicarrier signal; peak extraction section 212 that, when a detected power value is equal to or greater than a predetermined level, extracts signal component which is equal to or greater than the predetermined level, from one multicarrier signal; band limiting filter section 146 that allows to pass only predetermined band in the extracted signal component; adder 154 that subtracts the signal component after band-limiting from the other multicarrier signal; and multiplier 150, which is arranged subsequent to band limiting filter section 146, that multiplies the other multicarrier signal and the weight for compensation for power loss in band limiting filter section 146.

Additionally, the multicarrier transmitting apparatus provides: peak signal component fitting section 312 that changes a weight candidate sequentially and fits the waveform of the signal of multiplying each weight candidate and the peak signal component after band-limiting, with the waveform of peak signal components before band-limiting, and specifies the weight candidate which minimizes the difference of the both waveforms; and weight generation section 314 that forms a weight related to the specified weight candidate.

By this means, it is possible to subtract (peak) signal components compensated for by the optimal weight such that the difference of the waveform before and after band-limiting is minimum, from the original multicarrier signal, so that, speed of removing (peak) signal components becomes still faster than in Embodiment 1. As a result, the number of times subtraction of (peak) signal component is repeated decreases, thereby improving peak reduction efficiency. Furthermore, the number of times subtraction of (peak) signal component is repeated decreases, thereby minimizing the circuit scale and realizing miniaturization and weight reduction of the multicarrier transmitting apparatus.

Moreover, the above multicarrier transmitting apparatus may also provide: peak signal component fitting section 312 as a weight calculation section, that calculates the weight which matches the power value of the signal component before band-limiting, and the value of multiplying power value of the signal component after band-limiting and the weight related to the signal component after band-limiting; and weight generation section 314 that forms a calculated weight.

By this means, the sample point at a predetermined timing is only to be fitted, thereby reducing an amount of calculation processing.

Embodiment 4

Figure 4:
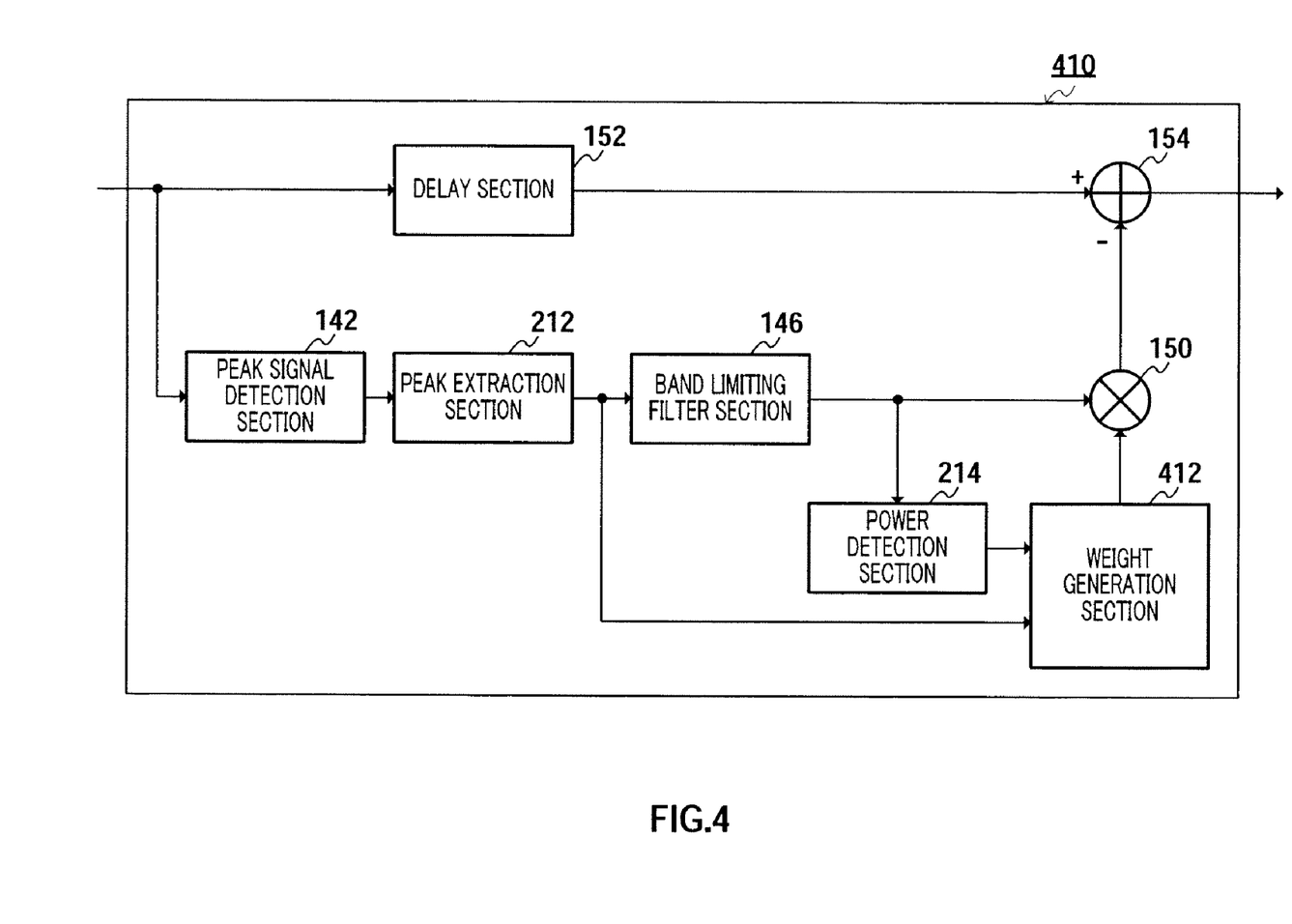
FIG. 4 is a block diagram showing a configuration of the peak reduction section of the multicarrier transmitting apparatus according to Embodiment 4 of the present invention.

As shown in FIG. 4, the multicarrier transmitting apparatus of Embodiment 4 has peak reduction section 410, and this peak reduction section 410 has weight generation section 412.

When a detected power value in each sample point is equal to or greater than a threshold value, weight generation section 412 inputs the detected power value outputted from peak extraction section 212, and forms a weight in accordance with this detected power values. To be more specific, weight generation section 412 forms a weight in proportion to an inputted detected power value. By this means, in the timings of occurrence of peaks, the weights are updated on a per sample timing basis (i.e. the timing shorter than 1 OFDM symbol).

Incidentally, although a case has been described here where a weight is formed in accordance with a detected power value, if, instead of power, amplitude is detected in peak signal component detection section 142, weight generation section 412 inputs a detected amplitude value outputted from peak extraction section 212 when the detected amplitude value in each sample point is equal to or greater than a threshold value, and may also form a weight in accordance with this detected amplitude value.

Moreover, incidentally, weight generation section 412 may also form a weight in accordance with a detected power value detected in power detection section 214, instead of the output from peak extraction section 212. Moreover, as well as this case, if, instead of power, amplitude is detected in power detection section 214, weight generation section 412 may also form a weight in accordance with this detected amplitude value.

In this way, according to Embodiment 3, multicarrier transmitting apparatus provides peak reduction section 410, and this peak reduction section 410 has: peak signal detection section 142 that divides a multicarrier signal into two and detects power values at regular intervals in one multicarrier signal; peak extraction section 144 that, when a detected power value is equal to or greater than a predetermined level, extracts signal component which is equal to or greater than the predetermined level, from one multicarrier signal; band limiting filter section 146 that allows to pass only predetermined band in the extracted signal component; adder 154 that subtracts the signal component after band-limiting from the other multicarrier signal; and multiplier 150, which is arranged subsequent to band limiting filter section 146, that multiplies the other multicarrier signal and the weight for compensation for power loss in band limiting filter section 146.

Then, this multicarrier transmitting apparatus further provides weight generation section that forms weights in accordance with power values of signal components before band-limiting or after band-limiting in band limiting filter section 146.

By this means, weights are formed in accordance with power values themselves detected before or after band-limiting, so that weights can be changed more adaptively (i.e. changing weights on a per sample point basis in the above explanation). Signal components (peak signal components) compensated for by these weights can be subtracted from the original multicarrier signal, so that speed of removing (peak) signal components becomes still faster. As a result, peak reduction efficiency is improved, thereby decreasing the number of times subtraction of (peak) signal component is repeated.

Other Embodiment

Although cases have been explained with Embodiments 1 and 4 where weight multiplying processing is performed after band-limiting, weight multiplying processing may also be performed before band-limiting.

Figure 5:
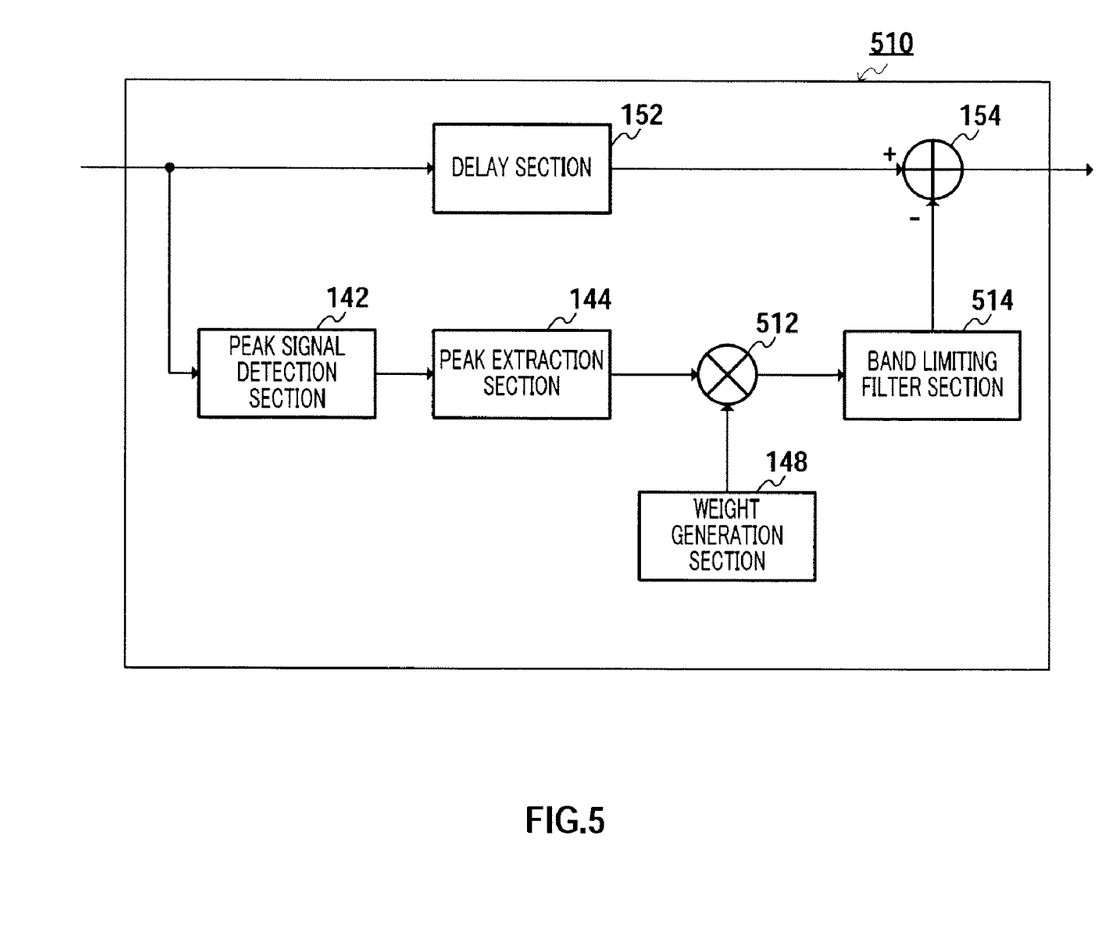
FIG. 5 is a block diagram showing a configuration of the peak reduction section of the multicarrier transmitting apparatus according to other embodiment of the present invention.

(1) When a case is applied to Embodiment 1, this multicarrier transmitting apparatus has peak reduction section 510 as shown in FIG. 5, and this peak reduction section 510 has multiplier 512 and band limiting filter section 514.

Multiplier 512 is arranged prior to band limiting filter section 514, multiplies an output signal from peak extraction section 144 and a weight formed in weight generation section 148 and outputs the result to band limiting filter section 514. Similar to Embodiment 1, this weight is for compensation for power loss resulting from band-limiting of peak signal components in band limiting section 514.

In this way, according to the present embodiment, multicarrier transmitting apparatus provides peak reduction section 510, and this peak reduction section 510 has: peak signal detection section 142 that divides a multicarrier signal into two and detects power values at regular intervals in one multicarrier signal; peak extraction section 144 that, when a detected power value is equal to or greater than a predetermined level, extracts signal component which is equal to or greater than the predetermined level, from one multicarrier signal; band limiting filter section 514 that allows to pass only predetermined band in the extracted signal component; adder 154 that subtracts the signal component after band-limiting from the other multicarrier signal; and multiplier 512, which is arranged prior to band limiting filter section 514, that multiplies the other multicarrier signal and the weight for compensation for power loss in band limiting filter section 514.

Figure 6:
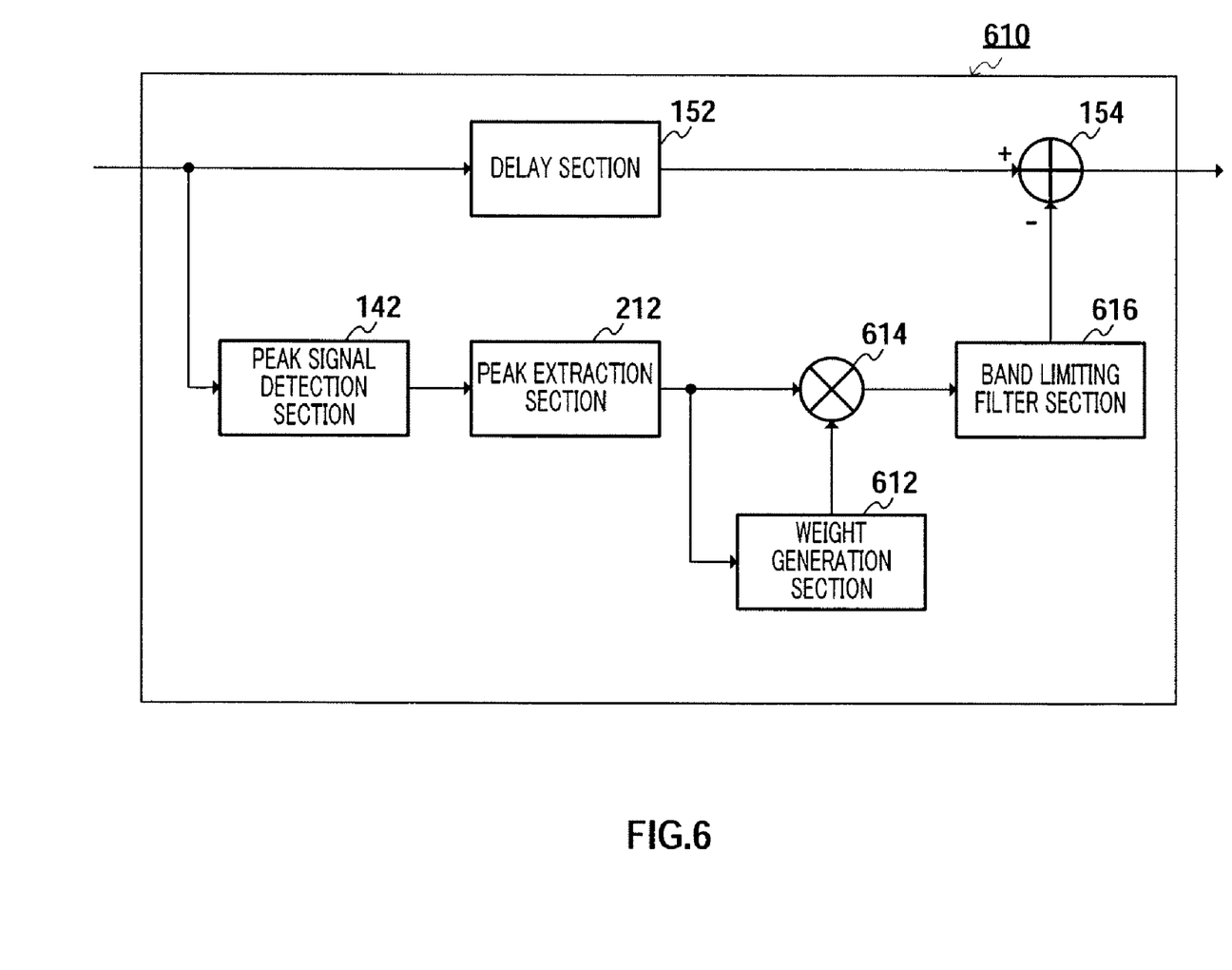
FIG. 6 is a block diagram showing a configuration of the peak reduction section of the multicarrier transmitting apparatus according to other embodiment of the present invention.

(2) Moreover, when a case is applied to Embodiment 4, this multicarrier transmitting apparatus has peak reduction section 610 as shown in FIG. 6, and this peak reduction section 610 has weight generation section 612, multiplier 614 and band limiting filter section 616.

Weight generation section 612 inputs a detected power value outputted from peak extraction section 212 when the detected power value in each sample point is equal to or more than a threshold value and forms a weight in accordance with this detected value. To be more specific, weight generation section 612 forms a weight in proportion to the inputted detected power value, for example.

Multiplier 614 is arranged prior to band limiting filter section 616, multiplies an output signal from peak extraction section 212 and a weight formed in weight generation section 612 and outputs the result to band limiting filter section 616. Similar to Embodiment 4, these weights are for compensation for power loss resulting from band-limiting of peak signal components in band limiting section 616.

In this way, according to the present embodiment, multicarrier transmitting apparatus provides peak reduction section 610, and this peak reduction section 610 has: peak signal detection section 142 that divides a multicarrier signal into two and detects power values at regular intervals in one multicarrier signal; peak extraction section 212 that, when a detected power value is equal to or greater than a predetermined level, extracts signal component which is equal to or greater than the predetermined level, from one multicarrier signal; band limiting filter section 616 that allows to pass only predetermined band in the extracted signal component; adder 154 that subtracts the signal component after band-limiting from the other multicarrier signal; and multiplier 614, which is arranged prior to band limiting filter section 616, that multiplies the other multicarrier signal and the weight for compensation for power loss in band limiting filter section 616.

Moreover, the multicarrier transmitting apparatus above provides weight generation section 612 that forms a weight in accordance with a power value of signal component before band-limiting in band limiting filter section 616.

INDUSTRIAL APPLICABILITY

The multicarrier transmitting apparatus of present invention is suitable for use in improving peak reduction efficiency in multicarrier signals.

The invention claimed is:

1. A multicarrier transmitting apparatus comprising:
a peak reduction section that reduces peak power appearing in a first multicarrier signal, the peak reduction section comprising:
   a power detection section that divides the first multicarrier signal into a second multicarrier signal and a third multicarrier signal and detects power values at regular intervals with respect to one of the second multicarrier signal and the third multicarrier signal;
   a signal component extraction section that extracts a signal component equal to or greater than a predetermined level from the one of the second multicarrier signal and the third multicarrier signal, the signal component being extracted when one of the detected power values is equal to or greater than the predetermined level;
   a band-limiting filter that only allows a predetermined band to pass in the extracted signal component to generate a band-limited signal component;
   a multiplier that multiplies the band-limited signal component and a weight to generate a weighted signal component, the weight being compensation for power loss in the band-limiting filter; and
   an adder that subtracts the weighted signal component from the other one of the second multicarrier signal and the third multicarrier signal.

2. The multicarrier transmitting apparatus according to claim 1, further comprising:
   a weight formation section that forms the weight in accordance with a difference between a first power value of the extracted signal component before the band-limiting in the band-limiting filter and a second power value of the band-limited signal component after the band-limiting in the band-limiting filter.

3. The multicarrier transmitting apparatus according to claim 1, further comprising:
   a fitting section that changes weight candidates sequentially, fits a first waveform of signals, derived by multiplying the band-limited signal component by the weight candidates, with a second waveform of the extracted signal component before the band-limiting in the band-limiting filter, and specifies a weight candidate that minimizes a difference of the waveforms; and
   a weight formation section that forms the weight related to the specified weight candidate.

4. The multicarrier transmitting apparatus according to claim 1, further comprising:
   a weight calculation section that calculates the weight so that the calculated weight matches a first power value of the extracted signal component before the band-limiting in the band-limiting filter, and a value of multiplying the weight and a second power value of the band-limited signal component after the band-limiting in the band-limiting filter; and
   a weight formation section that forms the calculated weight.

5. The multicarrier transmitting apparatus according to claim 1, further comprising:
   a weight formation section that forms the weight in accordance with a first power value of the extracted signal component before the band-limiting in the band-limiting filter or a second power value of the band-limited signal component after the band-limiting in the band limiting filter.

* * * * *